United States Patent [19]
Dugas

[11] Patent Number: 5,203,433
[45] Date of Patent: Apr. 20, 1993

[54] AUTOMATIC BRAKING WHEELCHAIR

[76] Inventor: Grady A. Dugas, P.O. Box 37, Taylor St., Marion, La. 71260

[21] Appl. No.: 807,518

[22] Filed: Dec. 16, 1991

[51] Int. Cl.$^5$ .............................................. B60T 1/00
[52] U.S. Cl. ...................... 188/2 F; 188/31; 188/69; 188/109; 188/167
[58] Field of Search .......... 188/2 F, 1.12, 17, 19, 188/20, 21, 22, 24.11, 26, 28, 29, 31, 60, 71.1, 67, 109, 110, 166, 167, 69, 265; 280/250.1, 304.1

[56] References Cited

U.S. PATENT DOCUMENTS

| | | | |
|---|---|---|---|
| 440,032 | 11/1890 | Herrington | 188/31 |
| 620,221 | 2/1899 | Breeze | 188/31 X |
| 1,045,632 | 11/1912 | Suppes | 188/31 |
| 1,090,011 | 3/1914 | Ballinger | 188/109 |
| 1,206,419 | 11/1916 | Dahms | 188/17 |
| 1,495,819 | 5/1924 | Thomas | 188/21 X |
| 1,646,971 | 10/1927 | Mendonca | 188/60 |
| 1,844,818 | 2/1932 | Gattie | 188/31 X |
| 2,053,852 | 9/1936 | Tracy | 155/30 |
| 2,259,924 | 10/1941 | Connolly | 188/109 |
| 3,174,768 | 3/1965 | Sanders et al. | 188/19 X |
| 3,302,757 | 2/1967 | Eagleson, Jr. | 188/167 |
| 3,356,185 | 12/1967 | Isaacks | 188/31 |
| 3,529,700 | 9/1970 | Marshall | 188/109 |
| 4,320,818 | 3/1982 | Knoche | 188/2 F |
| 4,623,043 | 11/1986 | Babilas | 188/2 F |

FOREIGN PATENT DOCUMENTS 693792 4/1930 France .................. 188/109

Primary Examiner—Douglas C. Butler
Attorney, Agent, or Firm—David L. Ray

[57] ABSTRACT

An automatic braking wheelchair having an automatic braking assembly which automatically locks one or both wheels of a wheelchair when the patient attempts to rise. The automatic braking assembly includes a movable seat, a locking bar connected to the movable seat having a cavity therein for receipt of the axle, and a locking member rigidly connected to the hub of the wheel which is received in the cavity of the locking bar to selectively lock the hub and wheel in a stationary position.

18 Claims, 2 Drawing Sheets

AUTOMATIC BRAKING WHEELCHAIR

BACKGROUND OF THE INVENTION

1. Field of the Invention

The present invention is related to wheelchairs. In particular, the present invention is related to braking devices for wheelchairs. More particularly, the present invention is related to braking devices which are actuated when a patient rises from the wheelchair.

2. Description of the Related Art

Getting in and out of a wheelchair is a dangerous task for patients. Physically and mentally disabled people are injured when they attempt to get out of, and especially into, the wheelchair without an attendant or nurse to assist them because the wheelchair rolls away from them as they attempt to rise from the wheelchair.

Injuries suffered by patients exiting wheelchairs are particularly among the mentally impaired. A mentally impaired patient told by a nurse to stay in the wheelchair until an attendant is summoned may forget the nurse's warning shortly after the nurse leaves the patient. Such occurrences commonly occur in homes for the elderly where there are many patients suffering from Alzheimer's disease and other mental frailties.

Braking assemblies for wheelchairs are known in the art. Exemplary of the braking assemblies of the prior art are those disclosed in the following U.S. Patents:

U.S. Pat. No. 4,623,043 discloses an automatic wheelchair brake which automatically locks both wheels when a patient attempts to rise from the wheelchair. While seated the patient manually operates a three-way lever brake with manually locked, manually unlocked and automatic positions. If the patient attempts to rise while the brake lever is in the manually unlocked position, the lever automatically returns to the automatic position and both wheels still lock automatically. After the patient has exited, the wheelchair may easily be moved by shifting the operating lever to the manual unlock position.

U.S. Pat. No. 4,320,818 discloses a wheelchair brake assembly for use with a conventional foldable wheelchair which provides a pair of rearwardly extending brake arms connected to adjacent side frames underneath the seat. Each brake arm includes a transverse forward portion pivoted to the side frame and having a brake shoe biased into engagement with a drive wheel. The rearward portion of each brake arm is provided with a post engageable by the wheelchair seat to pivot the brake shoe out of engagement with the wheel when the seat is depressed and moved downwardly by the weight of an occupant. The wheelchair side frames are connected by a tension spring to ensure that the brake is engaged when the wheelchair is unoccupied.

U.S. Pat. No. 3,529,700 discloses a brake assembly for wheelchairs including spring loaded brake elements mounted on the main frame of a wheelchair and biased toward wheel engagement. The elements are disengaged from the wheels in response to a seat controlled linkage or manually operable disengagement device.

U.S. Pat. No. 3,302,757 discloses an automatic immobilizing device in a wheelchair having a frame and a chair supported by at least two wheels rotatably mounted to either side of the chair, the improvement including two elongated lever members each pivotally mounted at one end to the frame, each lever member being substantially horizontally positioned, one each of the lever members being positioned adjacent one each of the wheels and each being disposed to engage and immobilize the adjacent wheel when urged pivotally downwardly; a spring assembly operatively connected to and disposed to urge each lever pivotally downwardly into engagement with the wheels; and a belt attached at either end to one of the levers, being suspended from the frame and extending across the levers from engaging and immobilizing the wheels when sat upon by a person and of such length that the spring urges the levers into engagement with the wheels when a person rises from the belt.

U.S. Pat. No. 2,259,924 discloses a braking device for invalid chairs having forward and rearward supporting wheels, a seat section movable about an approximately horizontal axis located between the forward and rearward wheels; at least one leg carried by the seat section forward of the axis, and a braking device for one or more of the rearward wheels connected with the seat section; the seat section being movable about the axis under control of an occupant of the chair to thereby shift both the leg and the braking device from an active position to an inactive position and vice versa.

U.S. Pat. No. 2,053,852 discloses a mechanical chair which is a combination of a frame; a seat pivoted adjacent its forward edge to the frame; a rotatable member having bearings in the frame and connected by an operating rod to the seat to raise and lower the latter about its pivot; a motor operatively connected to and rotating the member; a stopping device carried by the member operative to stop the actuation of the motor when the seat is in its extreme raised and lowered positions; and a manually operated actuation device for initiating actuation of the motor after it has been stopped.

SUMMARY OF THE INVENTION

In accordance with the present invention there is provided an automatic braking wheelchair having an automatic braking assembly which automatically locks both wheels of a wheelchair when the patient attempts to rise. The automatic braking assembly of the invention includes a movable seat, a locking bar connected to the movable seat having a cavity therein for receipt of the axle, and a locking member rigidly connected to the hub of the wheel which is received in the cavity of the locking bar to selectively lock the hub and wheel in a stationary position.

The automatic braking assembly of the invention has the advantage of providing a simple and effective low cost automatic braking system for wheelchairs.

Furthermore, the automatic braking system of the invention has the advantage of being easily and economically retrofitted to existing wheelchairs to provide automatic braking and present further patient injury.

In addition, the automatic braking system of the invention provides a positive mechanical lock for the wheels of the wheelchair rather than a frictional lock which contacts the rubber rim of the wheel.

DESCRIPTION OF THE PREFERRED EMBODIMENTS

Figure 1:
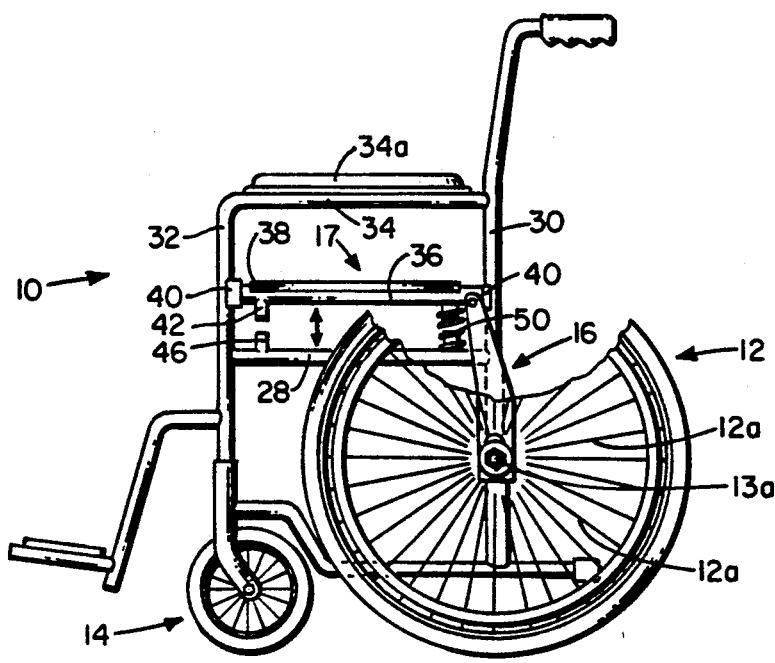
FIG. 1 is a partly cut-away, side elevational view of a automatic braking wheelchair employing the braking assembly of the present invention.

Referring now to the drawings, FIG. 1 illustrates the application of the automatic wheelchair braking assembly of the invention to a wheelchair generally indicated by the numeral 10. Wheelchair 10 is conventional wheelchair such as that shown in FIG. 1 through FIG. 3 of U.S. Pat. No. 4,320,818 which is hereby incorporated by reference.

Figure 4:
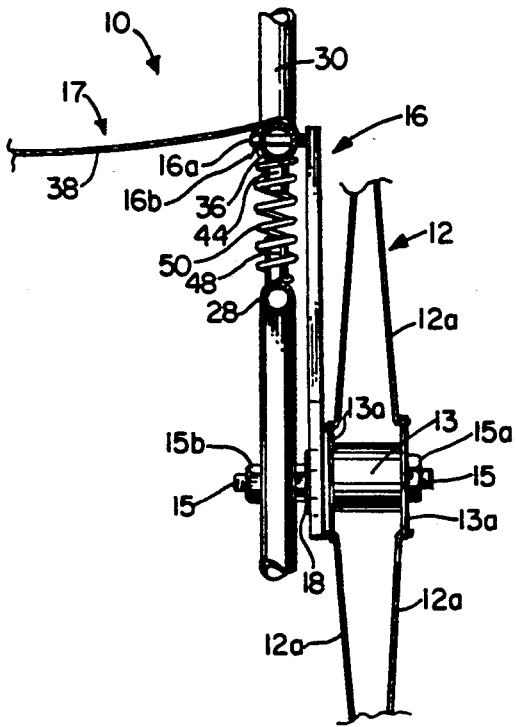
FIG. 4 is a partly cut-away view taken along lines 4—4 of FIG. 2.

As can be seen in FIG. 1, wheelchair 10 has two large rear drive wheels which can be turned manually by the patient which are generally indicated by the numeral 12, and wheelchair 10 has two small front wheels generally indicated by the numeral 14. Wheels 12 have a plurality of spokes 12a connected to outer plates 13a—13a of hub 13. As can best be seen in FIG. 4, hub 13 rotates about axle 15 and is held onto axle 15 by nut 15a.

Figure 5:
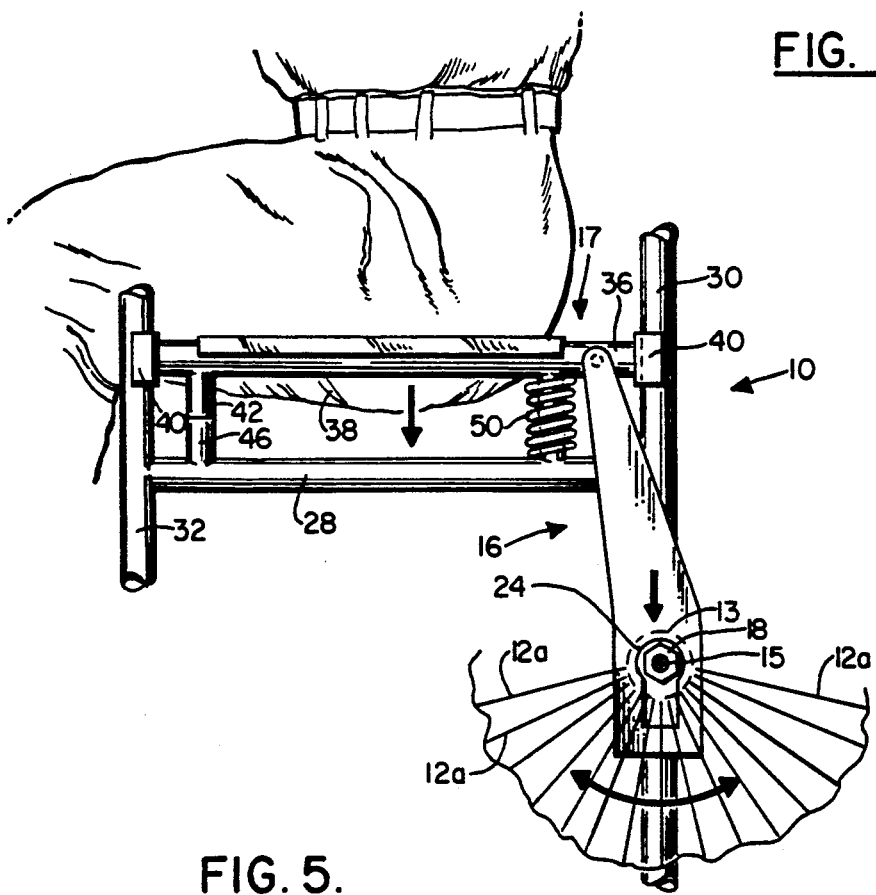
FIG. 5 is a partly cut-away side view of a the automatic braking system of the present invention in the unlocked position.

The automatic wheelchair braking assembly of the invention includes a locking bar generally indicated by the numeral 16 which is connected by pin 16a and cotter key 16b to the movable seat assembly generally indicated by the numeral 17. Locking bar 16 moves upward and downward with seat 17 to engage and disengage a locking member 18 shown in FIGS. 2, 4, and 5 which is rigidly connected to the inside of hub 13 of wheel 12.

Figure 3:
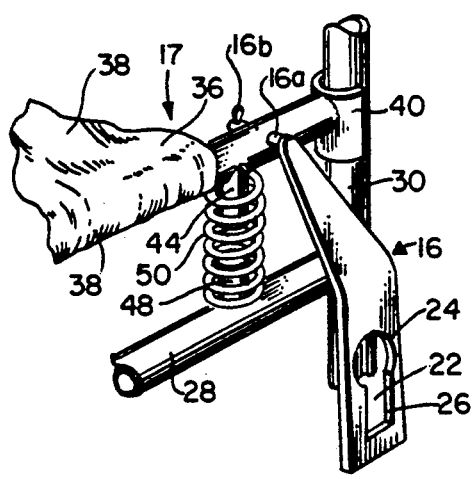
FIG. 3 is an enlarged, partly cut-away, perspective view of a portion of a wheelchair and automatic braking assembly of the present invention.

Locking bar 16 is preferably an elongated flat rigid metal bar having pin 16a rigidly connected thereto and a cavity therein generally indicated by the numeral 22 in FIG. 3 for receipt of locking member 18. Cavity 22 has a generally circular upper portion 24 in which locking member 18 may turn freely and a generally rectangular lower portion 26 which engages locking member 18 to lock hub 13 and wheel 12 in a stationary position. Locking bar 16 is located on the inside or wheelchair side of hub 13 to maintain locking member 18 inside cavity 22.

Figure 2:
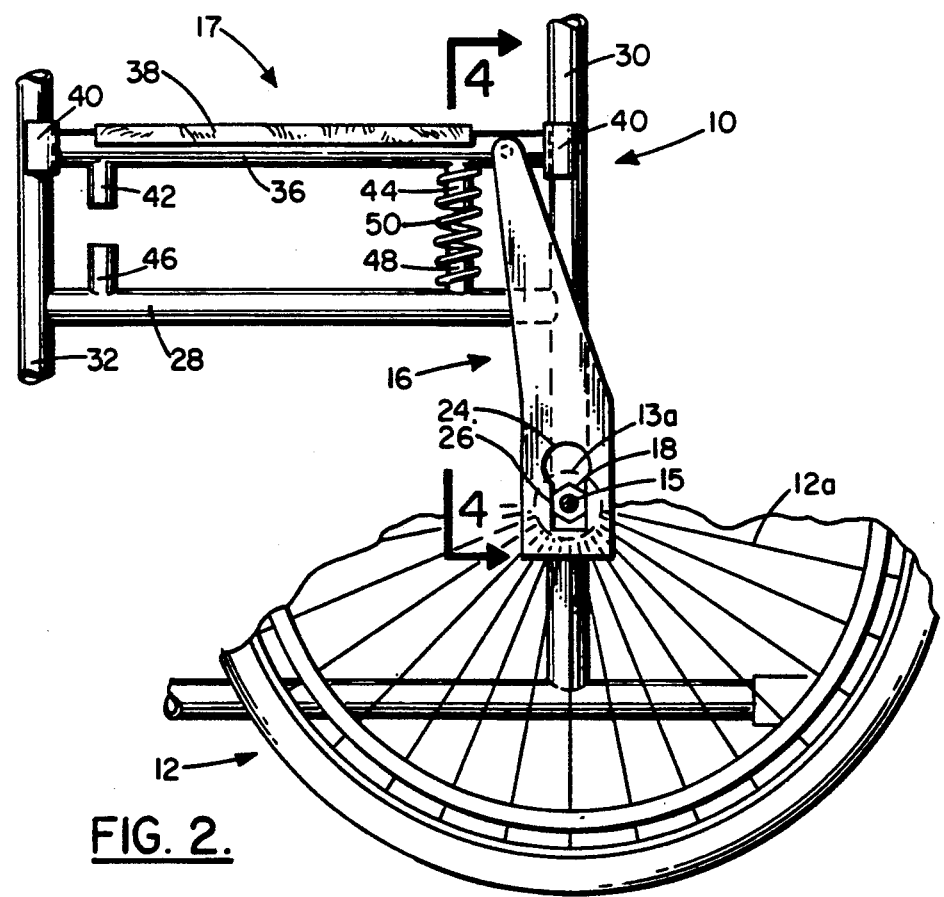
FIG. 2 is a partly cut-away, enlarged side elevational view of a portion of the automatic braking assembly of the present invention in the locked position.

In the position shown in FIGS. 1 and 2 rectangular lower portion 26 has engaged locking member 18 to lock the wheel 12 of wheelchair 10. In the position shown in FIG. 5 with the patient seated in wheelchair 10, seat 17 and locking bar 16 move downward as indicated by the arrows, and circular upper portion 24 of cavity 22 is positioned over locking member 18 enabling wheel 12 to roll freely.

Locking member 18 preferably is a conventional hexagonal metal nut having an opening in the center thereof which is large enough to rotate freely around axle 15 without touching axle 15, although locking member 18 may be rectangular in shape if desired. Locking member 18 is sized to fit and turn freely inside the rectangular portion 26 of cavity 22, and to contact the sides of rectangular portion 26 to lock wheel 12 in a stationary position. Locking member 18 may be rigidly attached to hub 13 by welding or the like, or locking member 18 may be integrally formed with plate 13a.

Wheelchair 10 has a horizontal support member 28 to which the wheelchair flexible seat would have been attached on a conventional wheelchair. Horizontal support member 28 rigidly connects vertical members 30 and 32 of wheelchair 10 located immediately below movable seat assembly 17. A conventional arm rest support member 34 shown in FIG. 1 also rigidly connects vertical members 30 and 32 above movable seat assembly 17. Arm rest 34a is connected to arm rest support member 34.

Movable seat assembly 17 includes two horizontal seat support members 36 on each side thereof having flexible seat 38 connected therebetween. At each end of horizontal seat support members 36 are semi-cylindrical guides 40 which extend approximately half-way around and slide upward and downward on vertical support members 30 and 32.

Axle 15 is rigidly connected to vertical support member 32 by nut 15b. Hub 13 is located sufficiently close to vertical support member 30 to maintain locking member 18 within cavity 22 of locking bar 16.

Located on the bottom of horizontal seat support members 36 are stops 42 and 44 which are vertically aligned with stops 46 and 48 which extend upwardly from horizontal support member 28. Stops 42, 44 and 46, 48 are sized to contact each other and stop the downward movement of seat assembly 17 when a patient is sitting in on seat 38 and the circular portion 24 of cavity 22 is aligned with locking member 18.

A spring 50 is place over stops 44 and 48. Spring 50 forces movable seat assembly upward when the wheelchair is unoccupied as shown in FIGS. 1-4 to align rectangular portion 26 with locking member 18 to lock wheel 12 in a stationary position. If desired, springs may also be placed over stops 42 and 46.

From the above it can be seen that the automatic braking assembly of the present invention can be easily fitted to existing, conventional wheelchairs in widespread use. The braking assembly can be connected to one or both of the two drive wheels 12, although it is preferred that the braking assembly is connected to both drive wheel. If desired, conventional supplemental braking devices well known in the art may be used in addition to the automatic braking assembly of the invention such as an additional brake that can be set to prevent the wheelchair from rolling even when occupied. Furthermore, the automatic braking assembly of the present invention can be incorporated into the construction of new wheelchairs.

Although the preferred embodiments of the invention have been described in detail above, it should be understood that the invention is in no sense limited thereby, and its scope is to be determined by that of the following claims:

What is claimed is:

1. An automatic braking assembly for a wheelchair having two large drive wheels which automatically locks one of the large drive wheels of the wheelchair when a patient attempts to rise from the wheelchair, each of the drive wheels of the wheelchair having a hub which rotates about an axle, comprising:

a. movable seat means on which the patient sits,
  b. support member means for supporting said movable seat means, said support member means having two axles connected thereto, each of said axles having a rotatable hub connected thereto, each of said hubs having a drive wheel rigidly connected thereto, said movable seat means being slidably connected to said support member means,
  c. spring means connected to said support member means and to said movable seat means for moving said movable seat means upwardly when the patient is not sitting in said movable seat means,
d. locking bar means connected to said movable seat means, said locking bar means having cavity means therein for receipt of said axle, and
e. locking member means rigidly connected to at least one of said hubs, said locking member means being received in said cavity means of said locking bar means to selectively lock said hub and said drive wheel in a stationary position.

2. The automatic braking assembly of claim 1 wherein said locking bar means is connected to said movable seat means by pin means.

3. The automatic braking assembly of claim 1 wherein said cavity means has a cylindrical portion which rotatably receives said locking member means.

4. The automatic braking assembly of claim 3 wherein said cavity means has a rectangular portion adjacent to said cylindrical portion.

5. The automatic braking assembly of claim 4 wherein said cylindrical portion of said cavity means is located above said rectangular portion of said cavity means.

6. The automatic braking assembly of claim 1 wherein said locking bar means is an elongated, flat metal bar extending vertically upward from said axle to said movable seat means.

7. The automatic braking assembly of claim 1 wherein said hub has an inside facing toward said wheelchair and an outside facing away from said wheelchair, and said locking member means is located on the inside of said hub.

8. The automatic braking assembly of claim 7 wherein said locking member means is rectangular in shape.

9. The automatic braking assembly of claim 7 wherein said locking member means has a hole in the center thereof for receipt of said axle.

10. The automatic braking assembly of claim 9 wherein said axle turns freely in said hole in said locking member means without contacting said locking member means.

11. The automatic braking assembly of claim 1 wherein said locking member means is hexagonal in shape.

12. The automatic braking assembly of claim 1 wherein said cavity means of said locking bar means has a circular portion adjacent to a rectangular portion, and said locking member means fits into said rectangular portion of said cavity means to lock said drive wheel.

13. The automatic braking assembly of claim 12 wherein said circular portion of said cavity means is located above said rectangular portion of said cavity means, and said circular portion of said cavity means is forced downward into registry with said locking member means when said patient sits in said movable seat means to enable said drive wheels to roll freely.

14. The automatic braking assembly of claim 13 wherein said rectangular portion of said cavity means is forced upward into locking engagement with said locking member means when said movable seat means is unoccupied to prevent said drive wheels from turning.

15. The automatic braking assembly of claim 14 wherein said spring means is located beneath said movable seat means.

16. An automatic braking wheelchair which is automatically prevented from rolling when a patient attempts to rise from the wheelchair, the wheelchair having two large drive wheels, each of said drive wheels of said wheelchair having a hub which rotates about an axle, comprising:
a. movable seat means upon which the patient may sit,
b. support member means for supporting said movable seat means, said support member means having two axles connected thereto, each of said axles having a rotatable hub connected thereto, each of said hubs having a drive wheel rigidly connected thereto, said movable seat means being slidably connected to said support member means,
c. spring means connected to said support member means and to said movable seat means for moving said movable seat means upwardly when the patient is not sitting in said movable seat means,
d. locking bar means connected to said movable seat means, said locking bar means having cavity means therein for receipt of said axle, and
e. locking member means rigidly connected to at least one of said hubs, said locking member means being received in said cavity means of said locking bar means to selectively lock said hub and said drive wheel in a stationary position.

17. The automatic braking wheelchair of claim 16 wherein said cavity means of said locking bar means has a circular portion adjacent to a rectangular portion, and said locking member means is adapted to fit into said rectangular portion of said cavity means to lock said drive wheel.

18. The automatic braking assembly of claim 17 wherein said circular portion of said cavity means is located above said rectangular portion of said cavity means, and said circular portion of said cavity means is forced downward into registry with said locking member means when the patient sits in said movable seat means to enable said drive wheels to roll freely.

* * * * *